May 28, 1940.  R. C. WORDEN  2,202,568
TILED WALL
Filed Aug. 30, 1937   9 Sheets-Sheet 3
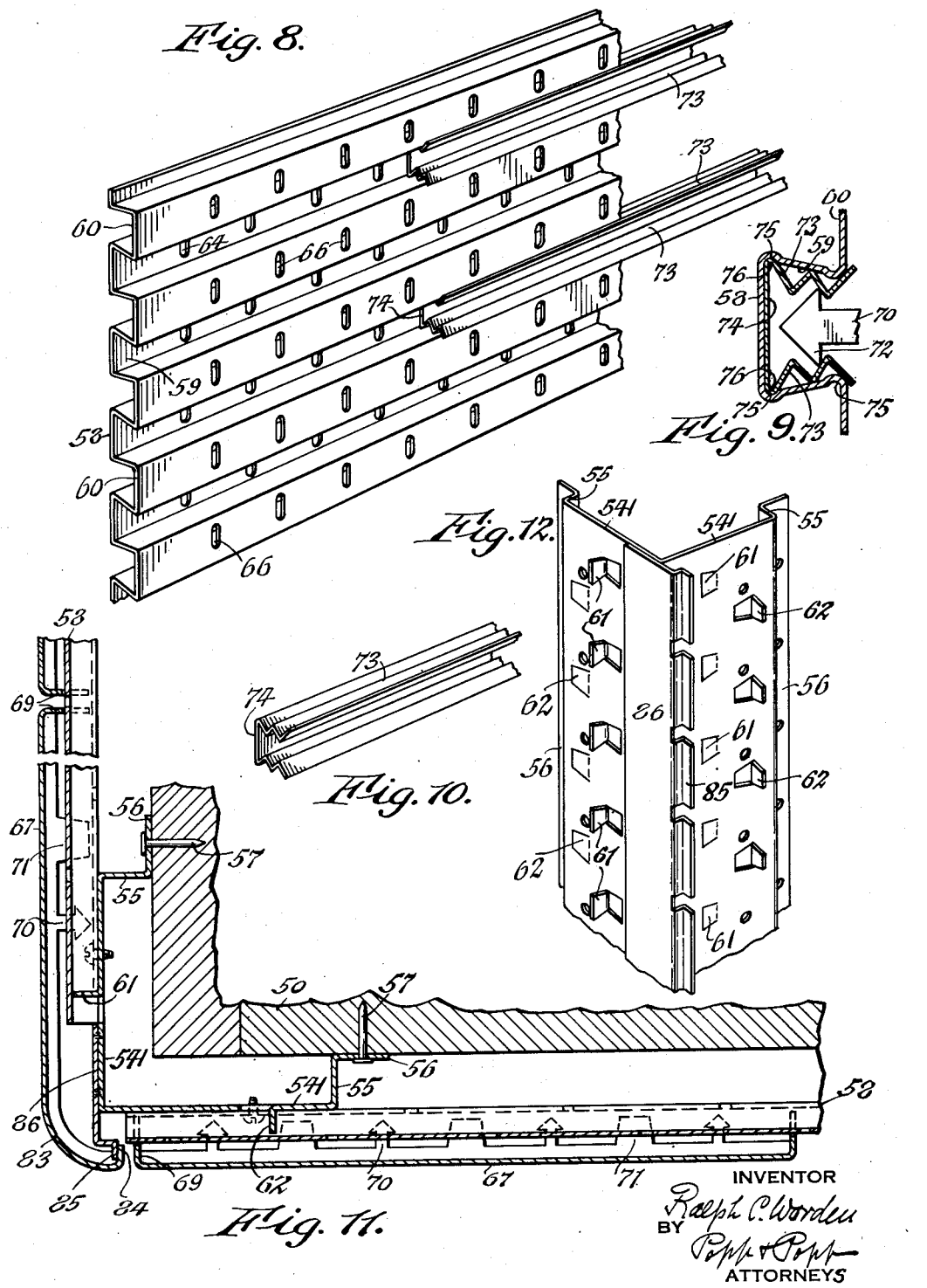

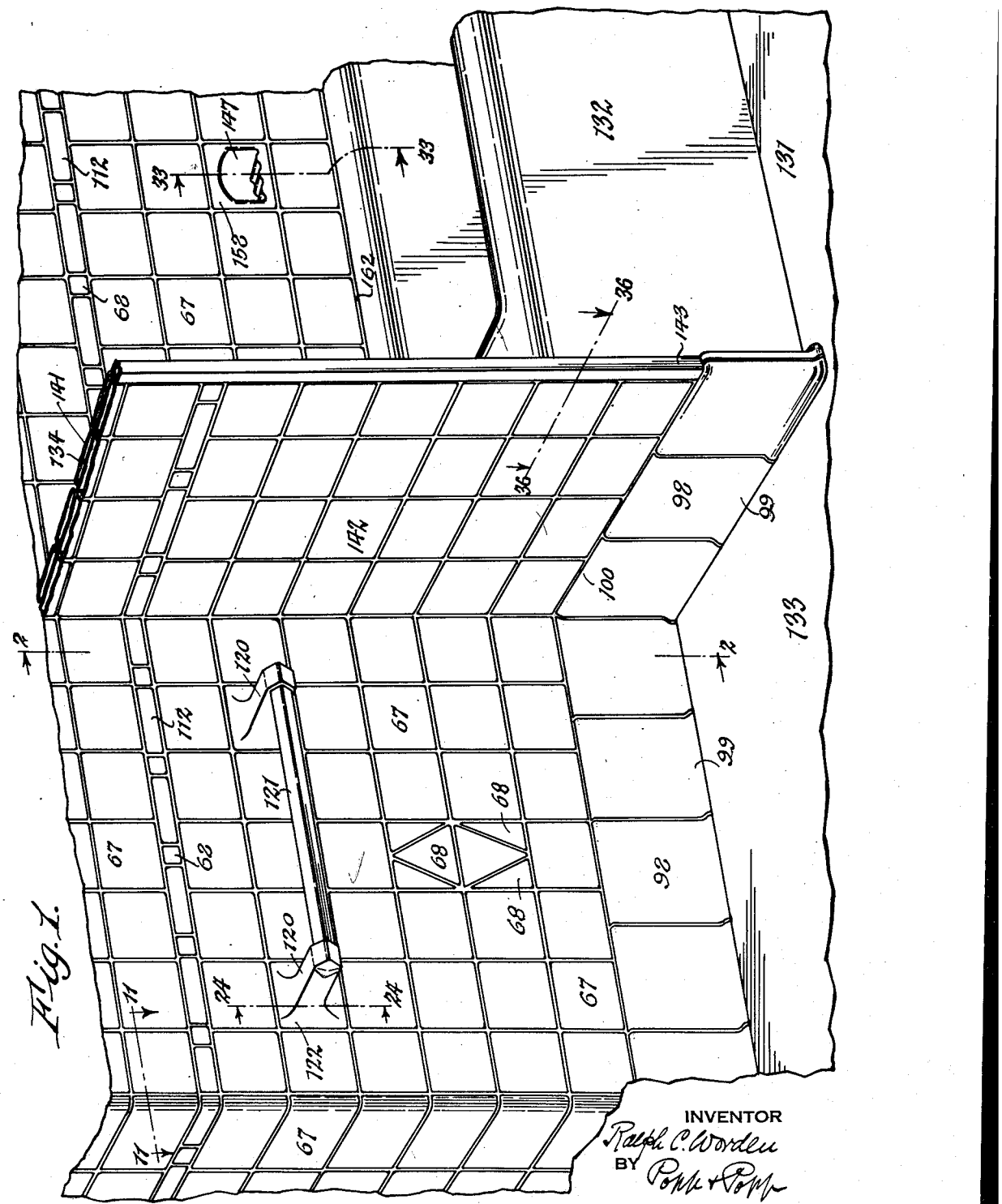

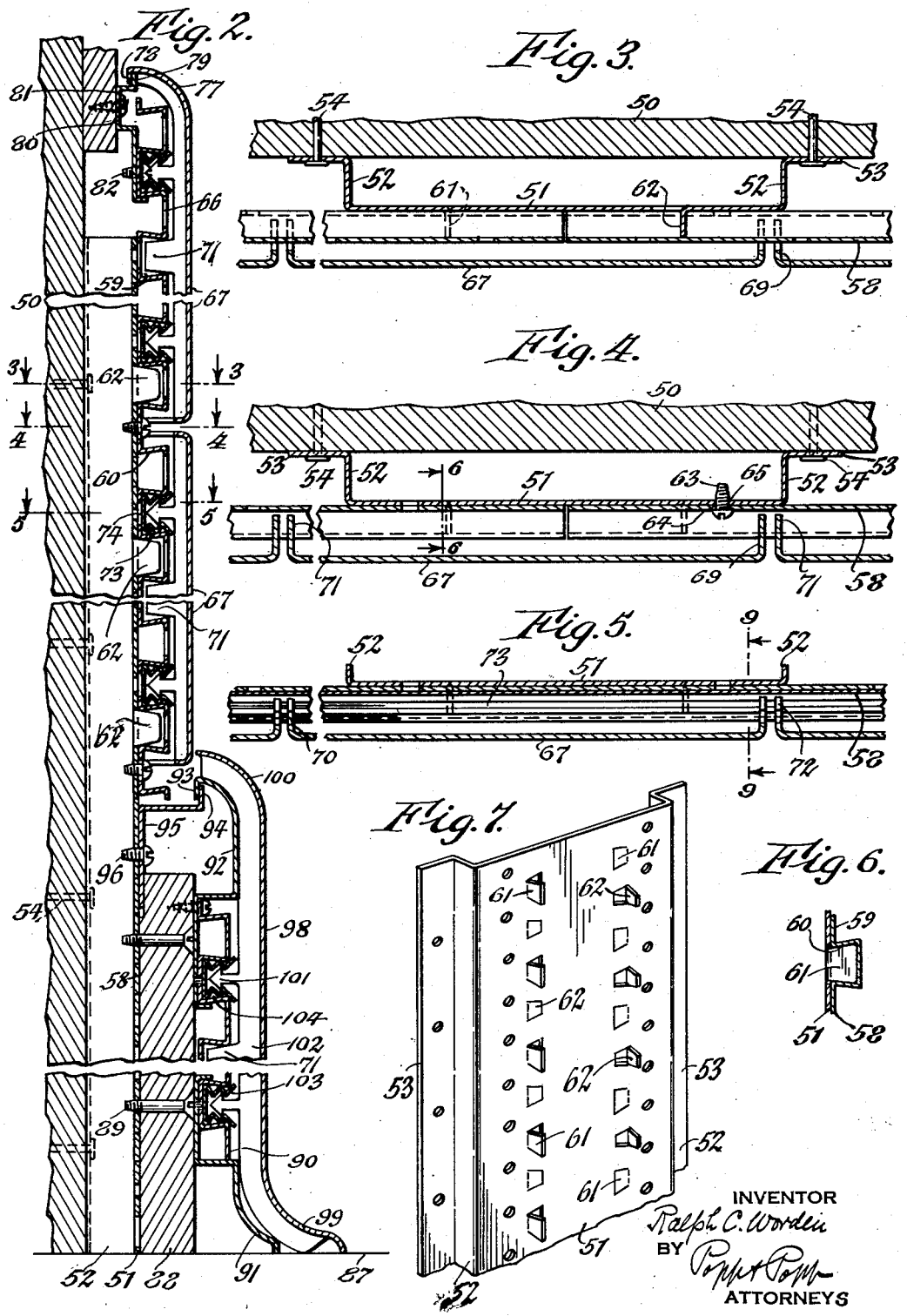

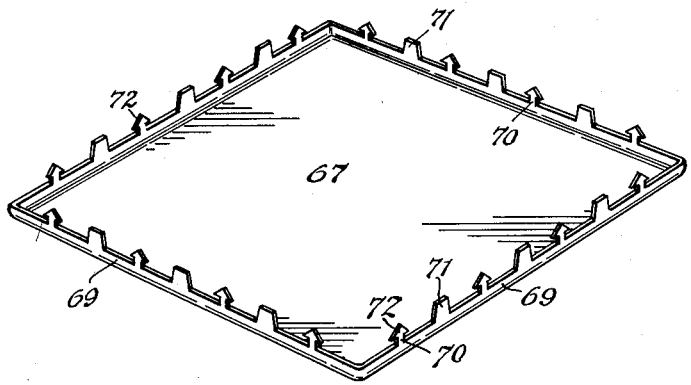
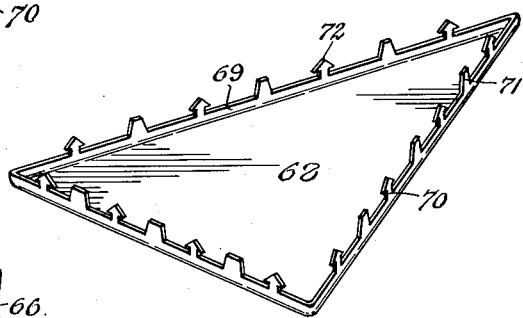
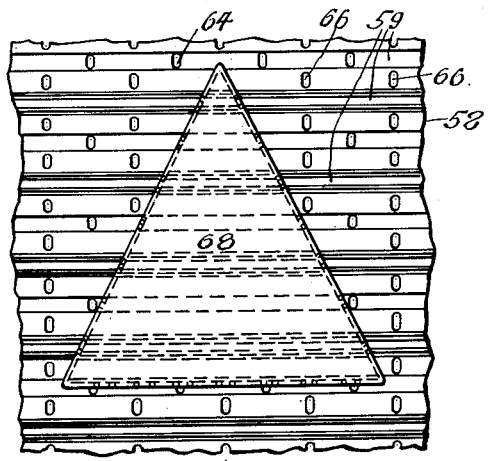
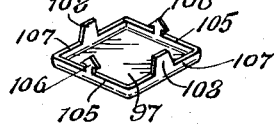
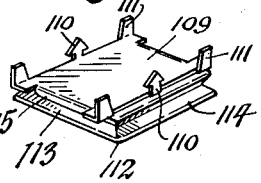
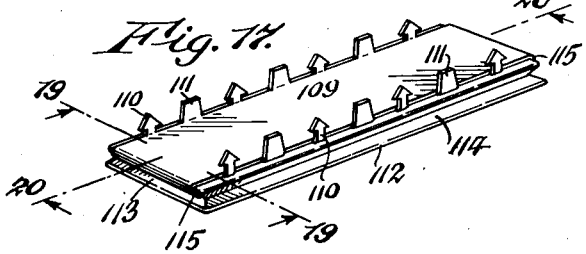

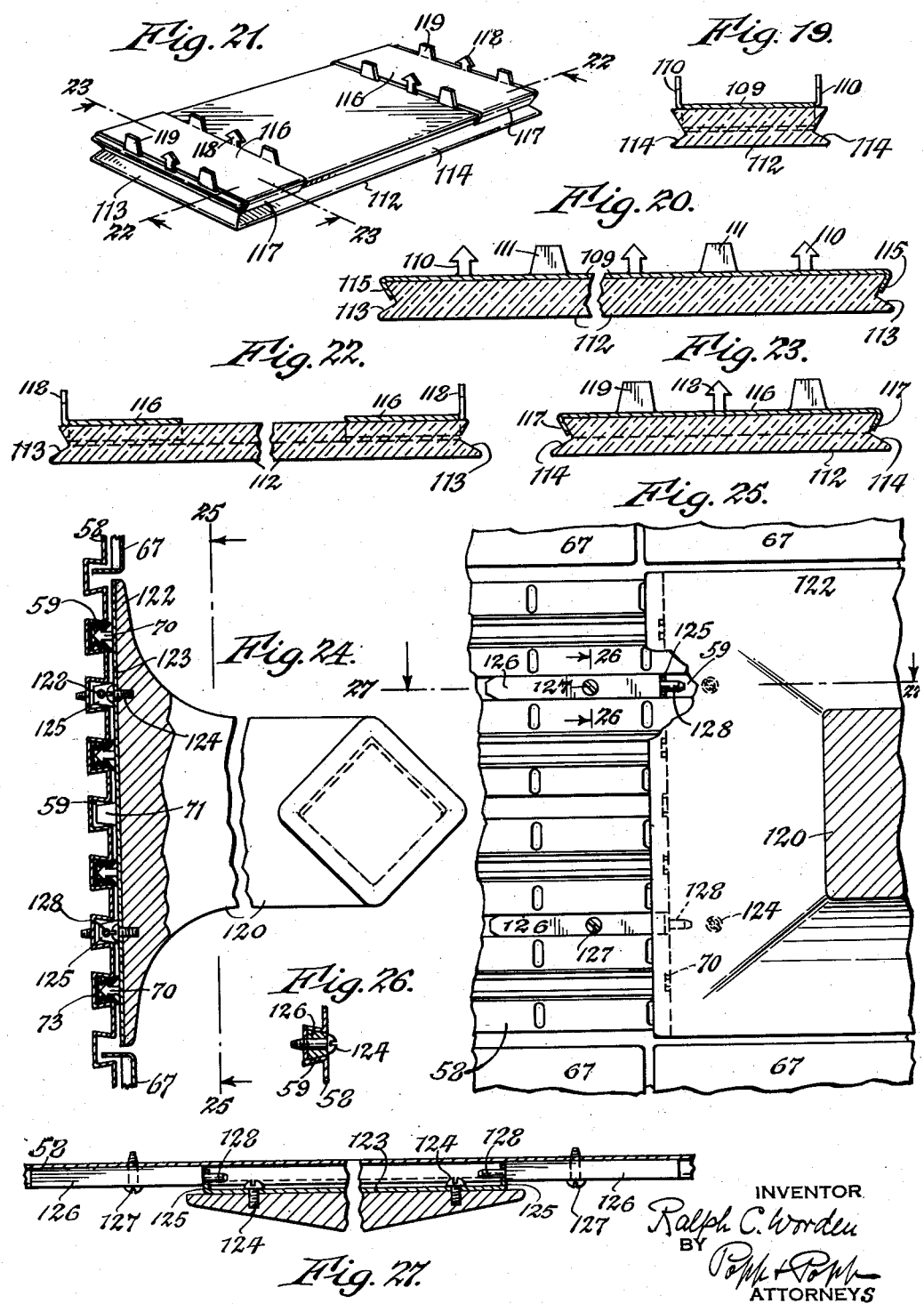

May 28, 1940. R. C. WORDEN 2,202,568
TILED WALL
Filed Aug. 30, 1937 9 Sheets-Sheet 6
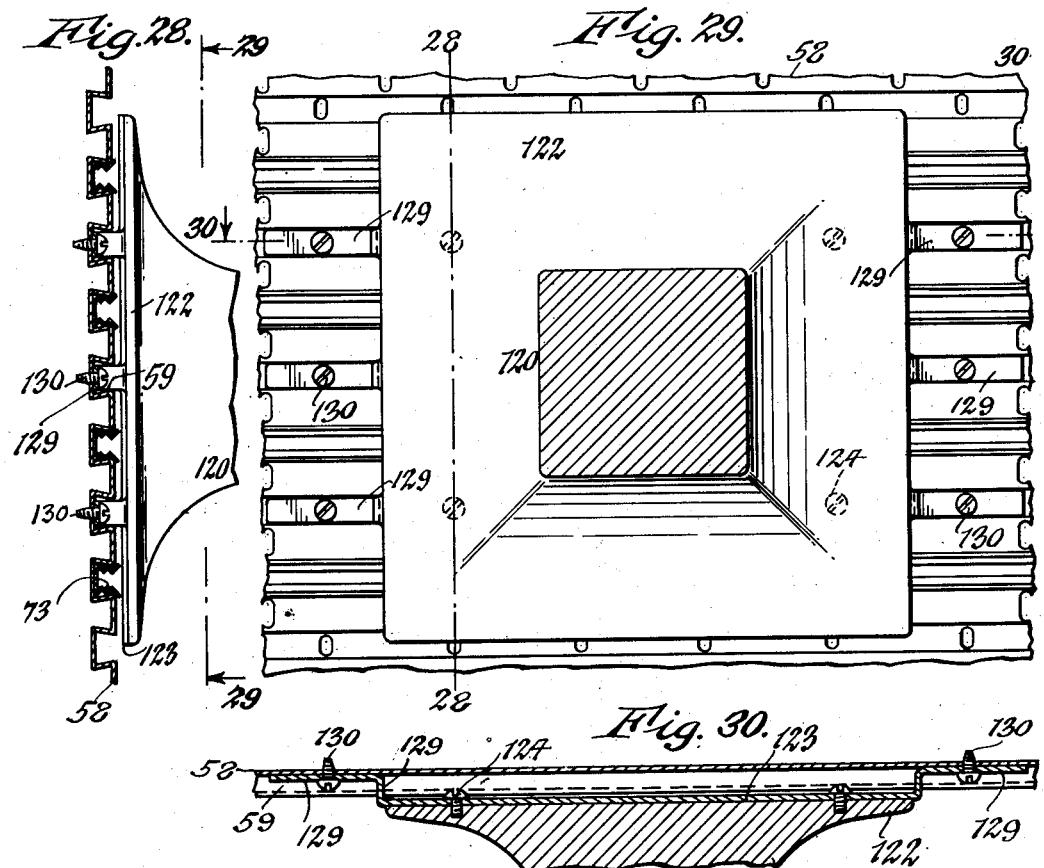
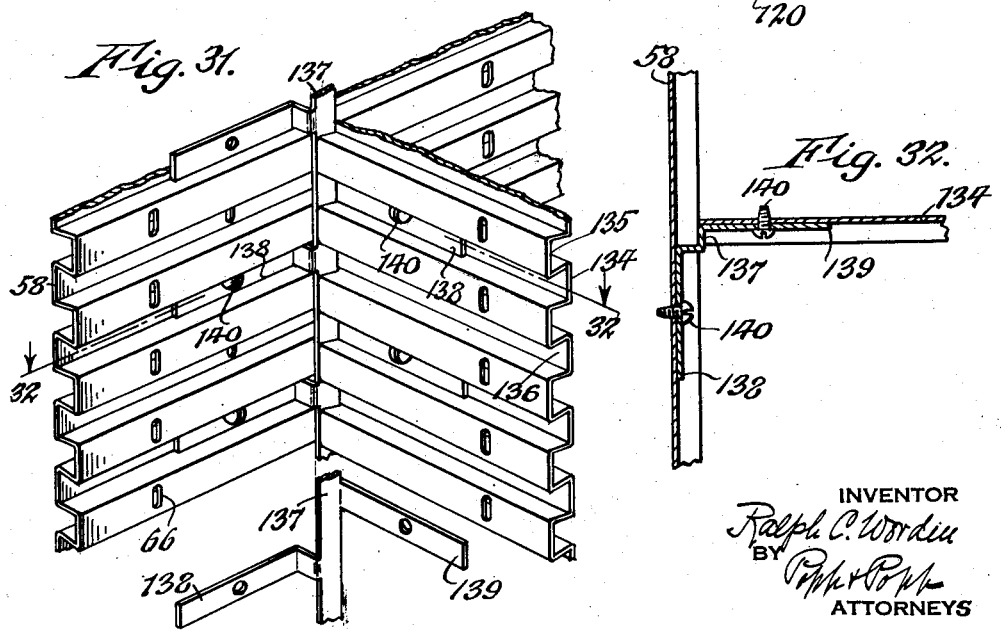
INVENTOR
Ralph C. Worden
BY
ATTORNEYS May 28, 1940.  R. C. WORDEN  2,202,568
TILED WALL
Filed Aug. 30, 1937  9 Sheets-Sheet 7
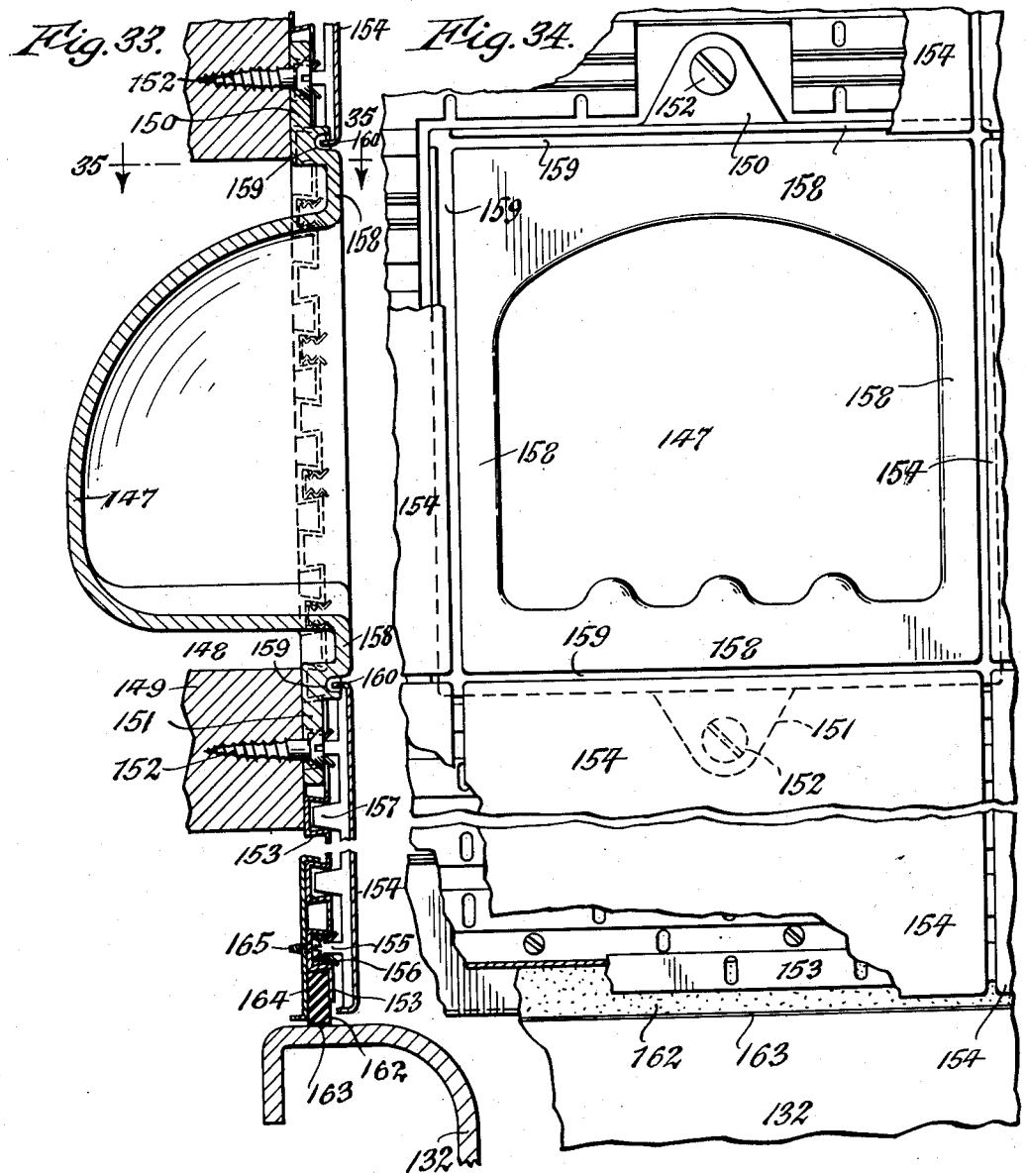
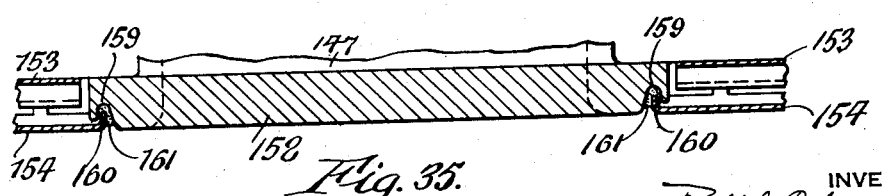
INVENTOR
Ralph C. Worden
BY
ATTORNEYS May 28, 1940.　　　　R. C. WORDEN　　　　2,202,568
TILED WALL
Filed Aug. 30, 1937　　　9 Sheets-Sheet 8
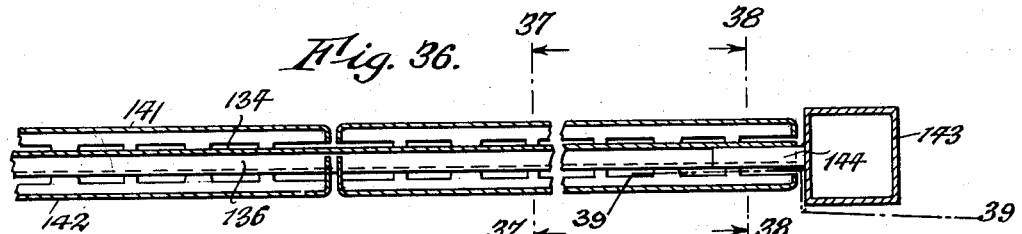
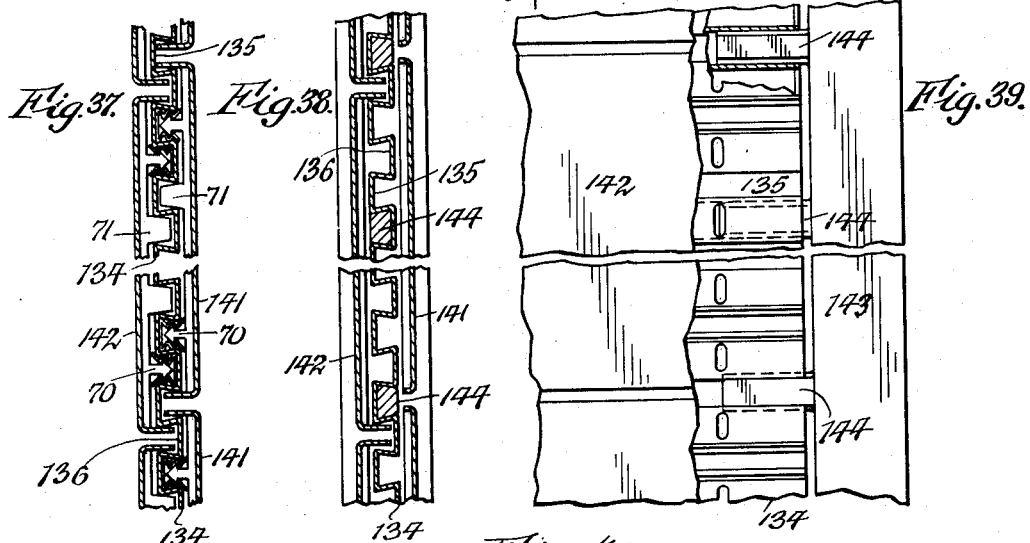
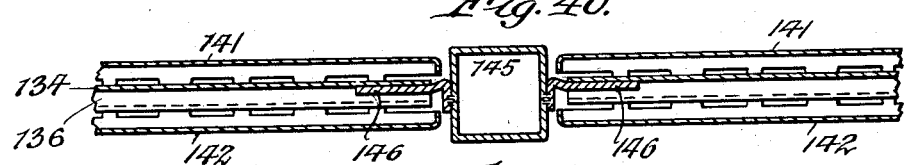
INVENTOR
Ralph C. Worden
BY
ATTORNEYS

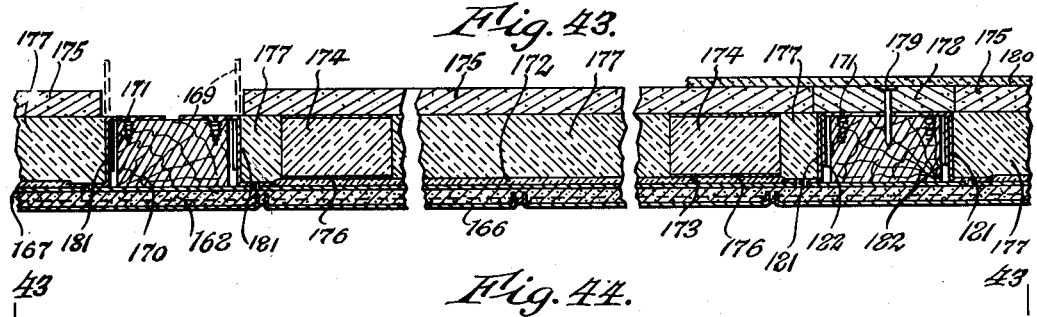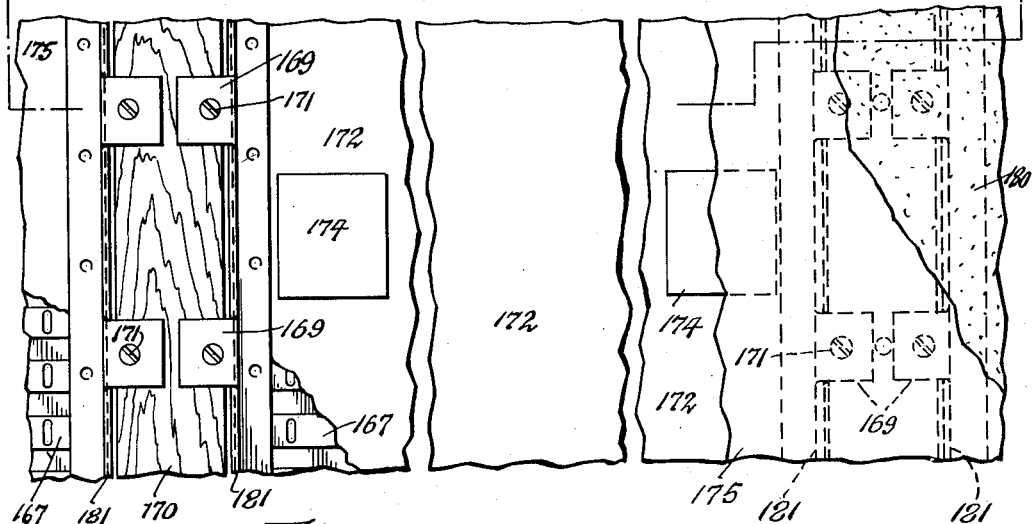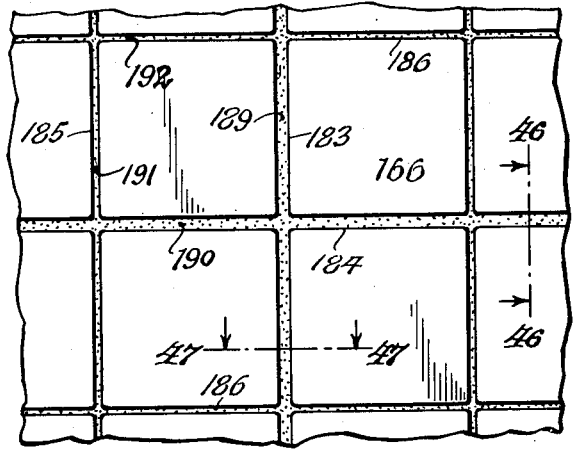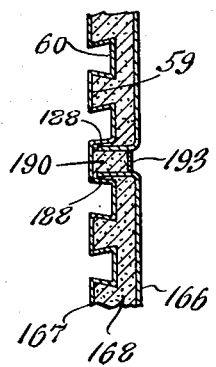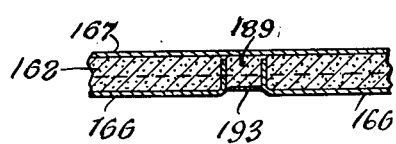

Patented May 28, 1940

2,202,568

UNITED STATES PATENT OFFICE 2,202,568

TILED WALL

Ralph C. Worden, Buffalo, N. Y.

Application August 30, 1937, Serial No. 161,619

14 Claims. (Cl. 189—88)

This invention relates to a tiled wall of the general character shown in Letters Patent of the United States No. 2,051,064 granted to me August 16, 1936, in which the tiles are constructed of enameled sheet steel.

The chief objects of the present invention are to provide an improved form of tile; to provide improved means whereby the tiles may be mounted easily and expeditiously on the body of the wall and securely held in place thereon; to provide superior means for securing various bathroom and other fixtures to the wall; to provide simple and efficient means for erecting a tiled wing in connection with a tiled wall; to so organize the tiling and the means for mounting the same on a wall body that the same may be pre-fabricated and assembled as units with the wall body; and to improve the tiled wall in several details as will be hereinafter fully set forth.

In the accompanying drawings:

Fig. 1 is a fragmentary perspective view of the inside of a building showing parts of a main wall, a partition and a bathroom.

Fig. 2 is a fragmentary vertical section, on an enlarged scale, of a wall taken on line 2—2, Fig. 1.

Figs. 3, 4 and 5 are fragmentary horizontal sections taken on the correspondingly numbered lines in Fig. 2.

Fig. 6 is a fragmentary section taken on line 6—6, Fig. 4.

Fig. 7 is a perspective view of one form of improved furring made in accordance with this invention.

Fig. 8 is a fragmentary perspective view of one form of backing embodying one feature of this invention and some of the resilient anchoring strips used in the dove-tail channels of this backing for receiving the spear-shaped anchoring prongs of the sheet steel tiles.

Fig. 9 is a fragmentary vertical section, on an enlarged scale, taken on line 9—9, Fig. 5 and showing the manner of securing a tile to the furring.

Fig. 10 is a perspective view of one of the resilient anchoring strips shown in Fig. 8.

Fig. 11 is a fragmentary horizontal section on an enlarged scale, taken on line 11—11, Fig. 1, and showing more particularly a corner of a tiled wall embodying this invention.

Fig. 12 is a perspective view of the form of furring used on the corners of the tiled walls in accordance with these improvements.

Fig. 13 is a perspective view of a square sheet steel tile embodying a feature of this invention.

Fig. 14 is a similar view of a tile of triangular form.

Fig. 15 is a fragmentary front elevation of a tiled wall showing the manner of securing a triangular tile to the backing.

Fig. 16 is a perspective view showing a very small tile made in accordance with this invention.

Fig. 17 is a perspective view of a composite tile adapted to be used as part of this invention and consisting of a sheet metal supporting clip and a facing of glass.

Fig. 18 is a similar view of a tile made like that shown in Fig. 18 but of smaller size.

Figs. 19 and 20 are transverse and longitudinal sections, respectively, of the tile shown in Fig. 17 and taken on the correspondingly numbered lines in said figure.

Fig. 21 is a perspective view of a composite tile showing the sheet metal supporting clip thereof made in sections.

Figs. 22 and 23 are longitudinal and transverse sections, respectively, taken on the correspondingly numbered lines in Fig. 21.

Fig. 24 is a vertical transverse section taken on line 24—24, Fig. 1 and showing the manner of using this invention in connection with a towel holder bracket or similar part in a bathroom.

Fig. 25 is a vertical longitudinal section taken on line 25—25, Fig. 24.

Fig. 26 is a fragmentary vertical section taken on line 26—26, Fig. 25.

Fig. 27 is a horizontal section taken on line 27—27, Fig. 25.

Fig. 28 is a vertical transverse section taken on line 28—28 of Fig. 29 showing a modified form of means for mounting a towel holder bracket in accordance with these improvements.

Fig. 29 is a vertical longitudinal section taken on line 29—29, Fig. 28.

Fig. 30 is a horizontal section taken on line 30—30, Fig. 29.

Fig. 31 is a fragmentary sectional perspective view showing novel means for connecting a tiled wing wall with a tiled main wall in accordance with this invention.

Fig. 32 is a horizontal section taken on line 32—32, Fig. 31.

Fig. 33 is a vertical transverse section taken on line 33—33, Fig. 1 showing the manner of mounting a soap dish or similar holder on a tiled wall in accordance with this invention.

Fig. 34 is a front elevation of the same.

Fig. 35 is a horizontal section taken on line 35—35, Fig. 33.

Fig. 36 is a horizontal section taken on line 36—36, Fig. 1.

Figs. 37 and 38 are vertical transverse sections taken on the correspondingly numbered lines in Fig. 36.

Fig. 39 is a vertical longitudinal section taken on line 39—39, Fig. 36.

Fig. 40 is a horizontal section taken on line 40—40, Fig. 41, and showing the manner of mounting a pilaster or intermediate post in a tiled wall embodying this improvement.

Fig. 41 is an elevation of the same, partly broken away.

Fig. 42 is a vertical section taken on line 42—42, Fig. 41.

Fig. 43 is a horizontal section, taken on line 43—43, Fig. 44, of a tiled wall embodying a modified form of this invention and combined with temperature insulating means.

Fig. 44 is an elevation of the same with parts broken away.

Fig. 45 is an elevation of a tiled wall showing another modification of this invention.

Fig. 46 is a vertical section taken on line 46—46, Fig. 45.

Fig. 47 is a horizontal section taken on line 47—47, Fig. 45.

In the following description similar characters of reference indicate like parts in the several figures of the drawings.

Referring to Figs. 1–5 and 11, the numeral 50 represents the upright body of a wall which may consist of any suitable material such as wooden studding of the character commonly employed in building construction. On this wall body is mounted a furring which may be variously constructed for use either on flat parts of the wall body or on the corners thereof. For use on flat parts of a wall body this furring, as shown in Figs. 2–7, may consist of a plurality of upright channel-shaped members each of which is made of sheet metal and comprises a front bearing plate 51 spaced from the wall body, upright spacing webs 52 projecting backwardly from the opposite vertical edges of the bearing plate, and attaching flanges 53 projecting laterally from the rear edges of the webs and secured to the wall body by nails 54, as shown in Figs. 2, 3 and 4, or by other suitable means. For use on an outer corner of a wall body in which the adjacent parts of the wall body are arranged at right angles to each other, the furring member is made of angular form, as shown in Figs. 11 and 12 and comprises a sheet metal plate bent to form two wings 541 arranged at right angles to one another, spacing webs 55 projecting backwardly from the opposite upright edges of these wings, and attaching flanges 56 projecting laterally from these webs and secured to the adjacent parts of the wall body by nails 57 or the like.

Upon the front sides of the bearing plates of the furring is mounted a backing which in the preferred construction consists of sheet metal, backing plates 58 each of which is bent into corrugated or zig-zag form to produce two vertical rows of horizontal channels 59, 60 on its front and rear sides, which channels open alternately toward the front and rear sides of this plate and each channel being preferably of dove-tail or undercut form in vertical section, as shown in Figs. 2, 6, 8 and 9. Each of these backing plates is preferably supported and aligned on the furring plates by a plurality of locking tongues or lugs 61 of dove-tail or headed form arranged on the furring plates and which project forwardly into the rearwardly opening dove-tail channels 60 of the backing plates and fit therein so as to interlock therewith, as shown in Fig. 6 and thereby positively securing the backing plates to the furring plates and supporting and aligning the former on the latter. For additionally supporting and aligning the backing plates on the furring plates the latter are provided with a plurality of non-headed tapering supporting and aligning lugs 62 which project forwardly into the rearwardly opening channels 60 of the backing plates and engages by a wedging fit with the narrowest parts thereof, as shown in Fig. 2, thereby serving to support and align the backing plates without however interlocking therewith. The locking tongues 61 and supporting and aligning lugs 62 are preferably formed by striking the same out of the bearing plates of the furring, as shown in Figs. 2, 3, 6, 7, 11 and 12.

In Fig. 7 the plate of the furring is so prepared that two vertical rows of locking tongues and supporting lugs may be struck forwardly out of this plate for engagement with the respective backing plate, thereby permitting the locking tongues and supporting and aligning lugs to be formed thereon as best suits the particular work in hand. As shown in Fig. 7, the locking tongues and supporting and aligning lugs are arranged alternately in each row, but in one row only the locking tongues are bent forwardly into an operative position and only the supporting and aligning lugs are bent forwardly into an operative position in the other row, and the tongues and lugs are staggered relative to each other, but any other arrangement of these tongues and lugs may be employed if desired. Each of the backing plates may be assembled with the respective furring plate by sliding the backing plate horizontally and parallel with the furring plate so as to engage the locking tongues and supporting and aligning lugs of the furring with the rearwardly opening channels of the backing plate, and after the latter is in the desired position the same may be held against horizontal displacement by means of screws 63 passing through vertical slots 64 in the rear parts of the backing plate and into threaded openings 65 in the furring plate, as shown in Figs. 2, 4 and 11.

Whenever possible the backing plates are slipped horizontally onto the furring plates and parallel thereto so as to engage both the headed lugs 61 and the non-headed lugs 62 with the respective channels on the rear side of the backing plates but if desired only the headed lugs 61 may be employed in which last mentioned case the non-headed lugs 62 which are not used may be left in an inoperative position flush with the body of the furring plates. When however a condition is presented in which it is impossible to slide the backing plate onto the furring plate then the headed lugs 61 are left in an inoperative position on the body of the furring plate and flush therewith, and only the non-headed tapering supporting and aligning lugs 62 are used and under such conditions the backing plate is merely pressed flatwise backwardly against the furring plate so that the non-headed lugs 62 engage by a wedge action with the respective rear channels of the backing plate, after which these members are held together by screws 63. By providing the furring plates with headed and non-headed lugs 61, 62 it is possible to use either one or both kinds of these lugs to meet whatever condition is presented in any particular situation. For example, if the finishing of the tiling of a wall occurs adjacent to an inner corner of the same and it is no longer possible to slide the backing plate on the furring, then the backing plate is merely pressed flatwise onto the furring in the manner described without utilizing the dove-tail lugs 61 and the dove-tail channels 60 for interlocking the backing plate and the furring plate. The backing plates are also provided with slots 66 in the front parts which may be arranged vertically, as shown in Figs. 2 and 8, or horizontally if desired and which not only permits the backing plates to be mounted with either side toward the furring plates, but the front slots 66 also permit cement to flow through these openings and form cement keys or anchors for holding the tiling by cement on the front side of the backing as will presently appear.

Upon the front side of the backing plates tiles of any suitable character and shape may be mounted in accordance with this invention, for example tiles made of sheet steel and enameled in any desired color and having a plate-shaped body which may be of any desired contour, such as the square shape shown at 67 in Figs. 1 and 13, and the triangular shape 68 shown in Figs. 1, 14 and 15. Each of these tiles has the edges of its plate provided with rearwardly projecting flanges 69, and at its rear edge each flange is provided with a plurality of rearwardly projecting teeth 70, 71 which are arranged in a row lengthwise of each of the edge flanges of the respective tile. Each of the teeth 70 has a spear-shaped anchoring or locking head 72 which is adapted to fasten the tile to the backing and each of the teeth 71 is of rearwardly tapering form and is adapted to support and align the tile on the backing by wedgingly engaging the upper and lower inclined edges of the vertical rows of lugs 71 with the narrow parts of the channels on the front side of the backing plate as shown in Fig. 2. These fastening and supporting and aligning teeth preferably alternate with each other in each row on the tile, as shown in Figs. 13 and 14.

The tiles are assembled with the backing plates by the upright rows of teeth on the tiles engaging vertically with the forwardly opening channels in the backing plate and engaging the horizontal rows of teeth on the tiles horizontally with the adjacent horizontal forwardly opening channels of the backing plate.

Each of the vertical supporting and aligning teeth 71 engages its upper and lower inclined edges with the upper and lower sides of the narrowest part of some of the front channels of the backing plate and thus produces a wedging fit between the same and perfect alignment of the tile. Resilient strip-shaped sockets are arranged in some of the other front channels for receiving the spear-shaped heads on the other vertical teeth 70 of the tiles and thereby cause the tiles to be fastened to the backing plates in a properly aligned position. Each of these sockets is preferably constructed of spring sheet metal in the form of a forwardly opening trough the upper and lower walls 73, 73 of which are corrugated lengthwise and horizontally and engaged with the upper and lower sides of the respective front channel of the backing plate, and the bottom 74 of which is flat and engages with the bottom of the respective front channel of the backing plate. As the spear-shaped heads 72 of the teeth 70 of the tiles are pushed into the corrugated resilient sockets the opposite sides of the widest part of each spear head springs past these corrugations and becomes interlocked therewith, as shown in Fig. 9, and thereby holds the tile on the backing. Previous to assembling the tiles with the backing cement is applied to the backing for filling the front channels therein, then a coating of cement is applied to the back of the tiles and the tiles are applied to the backing during which time the excess cement is forced through the openings 66 in the backing, thereby securing the tiles to the backing and lending strength to the section of the wall when the cement has become dry and hard.

In order to reliably retain the resilient socket strips in the channels of the backing plate, each of these channels is provided on opposite sides of its wide rear part with outwardly enlarged grooves 75 into which the opposite widened rear corners 76 of the corrugated socket strips are adapted to slide lengthwise, as shown in Fig. 8, and become interlocked therewith, as shown in Fig. 9, so as to hold these socket strips in an assembled position within the front channels of the backing plates.

In order to produce a finished appearance of the upper edge of the tiled area of the wall, the upper edge of each of the tiles along the upper marginal part of the tiled area is provided with a backwardly turned rim 77, as shown in Fig. 2, said rim being provided with a depending hook flange 78 which overhangs a cooperating upwardly projecting hook flange 79 on a bracket plate 80 secured to the adjacent part of the wall body by a screw 81 or otherwise. Between the tile flange 78 and the adjacent part of the wall body a filling of cement is placed for producing a water-tight joint between these parts.

The bracket plate 80 in effect forms part of the furring and if desired the uppermost part of the backing plate may be secured to the same by a screw 82, as shown in Fig. 2.

At the outer corner of a wall a rounded effect is produced by bending the vertical edge of the tiles on one side of the corner backwardly to form a curved rim thereon, as shown at 83 in Fig. 11, and provide the vertical edge of this rim with an inwardly turned flange 84 which overlaps a cooperating flange 85 on a bracket plate 86 which is connected by spot welding or otherwise with the adjacent part of the corner furring. The horizontal and vertical gaps or spaces between the adjacent edges of tiles are filled or pointed with cement and this pointing may be painted with any suitable color, or treated in any other suitable manner.

Along the base of the wall body and adjacent to the horizontal floor 87 the tiling of the wall is constructed and mounted as shown in Figs. 1 and 2 as follows:

The numeral 88 represents a filling block of wood secured to the lower part of the furring above the floor by means of screws 89 or the like. In front of this filling block and the adjacent part of the furring plate 51 is arranged a base backing plate 90 which is secured thereto in any suitable manner and is constructed of corrugated or channeled form similar to the upper backing plates 58. To the lower end of the base backing plate 90 is secured by spot welding or otherwise a forwardly projecting sheet metal supporting foot 91 which rests on the floor, and to the upper end of this base backing plate is secured, by spot welding or otherwise, a forwardly projecting sheet metal coupling head 92, the upper end of which has a depending flange 93 overhanging a coopcrating flange 94 on a sheet metal backing plate 95 secured to the adjacent part of the upper furring plate 81 by a screw 96. The tiling for the base of the wall comprises a plurality of base tiles each of which has an upright flat body 98 arranged in front of the base backing plate 90 and provided at its lower end with a forwardly turned foot 99 resting on the floor and provided at its upper end with a rearwardly turned head 100 which overhangs the upper part of the coupling head 92. Each of the base tiles is attached to the adjacent part of the base backing plates by means of spear-shaped locking teeth 101 projecting backwardly from vertical flanges 102 on the respective base tile and interlocking with resilient socket strips 103 arranged in the front channels 104 of the base backing plate 90 in the same manner as this is accomplished between the upper tiles and backing plates heretofore described. These base tiles are additionally secured on the base backing plates by cement and the joints between adjacent base tiles and between the base tiles and the upper tiles are filled or pointed with cement for finishing these joints and rendering them leaktight.

In Figs. 1–5, 11 and 13 the tiles 67 are of comparatively large area or size and each tile has its several flanges provided with spear-shaped anchoring teeth and also with tapering supporting and aligning teeth but if desired the tiles 97 may be made of smaller size or area and only the vertical flanges 105 provided with spear shaped teeth 106, as shown in Fig. 16, for interlocking with the resilient sockets of the channeled backing plates and its horizontal flanges 107 may be provided solely with tapered teeth for engagement with the front channels of the backing plates.

Instead of making the tiles wholly of sheet steel the same may be composed partly of sheet steel and partly of vitreous material such as glass. Tiles of this character are shown in Figs. 16–23 and are constructed as follows:

Referring to Figs. 17, 19 and 20 the numeral 109 represents a rear supporting plate of sheet steel of oblong form which is provided at its opposite longitudinal edges with longitudinal rows of rearwardly projecting teeth, each row having spear shaped anchoring teeth 110 and tapering supporting and aligning teeth 111 which alternate and are adapted to be secured in front channels of the backing plate in the manner heretofore described. In front of the supporting plate 109 is arranged an oblong facing plate 112 of vitreous material such as glass of any suitable color which is provided in its transverse and longitudinal edges with grooves 113, 114 and is connected with the respective supporting plate 109 by hooks 115 arranged on the transverse ends of the supporting plate and engaging with the transverse grooves of the facing plate, as shown in Figs. 17 and 20. By grooving the several edges of the facing plate cement may be used for attaching the supporting plates 109 on their rear sides to the backing plates and cement may also be placed between the opposing edges of adjacent tiles and in the grooves thereof for securely holding the tiles in place on the backing plates.

When the composite tiles are comparatively long the end teeth of the supporting plate may be arranged at a distance from the ends of the tile, as shown in Fig. 17, but if the composite tile is comparatively short, as shown in Fig. 18, then the endmost teeth of its supporting plate may be arranged at the corners of the tile, so as to reliably align and support the same on the backing plate.

In Figs. 17–20 the metal supporting plate of the composite tile is made in one piece and covers the entire rear side of the facing plate but in Figs. 21, 22 and 23 the metal supporting plate is made in two sections 116 which extend transversely across the rear side of the facing plate 112 and each of which is provided with forwardly projecting hooks 117 at its ends engaging with the longitudinal grooves 114 of the facing plate and with rearwardly projecting spear-shaped teeth 118 and tapering teething 119 adapted to be secured in the front channels of the backing plate.

Improved means are provided for attaching brackets or arms 120 to the tiled wall for supporting towel bars 121 in the bathroom, as shown in Figs. 1, 24–27, or for supporting other articles. As shown in these figures each of these brackets or arms is provided with a base 122 preferably formed integrally therewith of cast iron and having the general outline of a square tile so as to take the place of a regular tile on the tiled surface of the wall. On its rear side the bracket base 122 is provided with a metal attaching plate 123 secured thereto by screws 124 or the like and provided at its opposite vertical edges with rearwardly projecting fastening ears 125 which project into front channels of the backing plate and each of these ears being provided with a perforation. Within the channels which receive the fastenig ears 125 locking bars 126 of dove-tail form in cross section are placed and secured therein adjacent to opposite vertical edges of the bracket base 122 by means of screws 127, as shown in Figs. 25, 26 and 27. Each of these locking bars is provided at one end with a fastening pin or dowel 128 which engages with one of the perforated ears 125 of the attaching plate 123 and thus serves to hold the bracket 120 on the backing plate. If desired the fastening plate 123 of the bracket 120 may be attached to the backing plate 58 by the means shown in Figs. 28, 29 and 30 which consist of angular arms 129 projecting rearwardly from the vertical edges of the attaching or fastening plate 123 into adjacent front channels of the backing plate and secured thereto by screws 130. The attaching or connecting plate 123 may also be provided with spear-headed teeth 70 and non-headed teeth 71 which engage with the resilient socket strips 73 in the front channels of the backing plate, as shown in Figs. 24 and 25.

For the purpose of erecting a wing wall at right angles to a main wall for dividing a bathroom into compartments one 131 of which may contain a bathtub 132, as shown in Fig. 1, and the other 133 a shower bath or other convenience the following means are provided for erecting such wings having tiling on its opposite sides.

Referring to Figs. 31, 32, 36, 37, 38 and 39, the numeral 134 represents an upright corrugated backing plate of sheet steel which is arranged at right angles to the backing plate 58 of the main wall, as shown in Fig. 31, and constructed in like manner so as to provide horizontal channels 135, 136 in vertical rows on opposite sides of this wing backing plate and each of these channels being of dove-tail form in cross section similar to the construction of the channels in the backing plate of the main wall. Various means may be employed for connecting the inner vertical end of the wing wall backing plate with the main wall backing plate but it is preferable to employ for this purpose an upright coupling bar 137 interposed between the inner end of the wing wall backing plate and the front side of the main wall backing plate and provided at different points in its height with coupling arms 138, 139 which are arranged alternately parallel with the main wall backing plate and the wing wall backing plate and are secured respectively to the bottoms of the respective channels of these backing plates by screws 140 so as to firmly connect the same, as shown in Figs. 31 and 32.

When employing a corrugated backing plate in a wing wall the channels 135, 136 on opposite sides of the same are employed for mounting tiles 141, 142 on both sides of this backing plate in the same manner in which this is done when mounting tiles only on the front channels of a main wall backing plate, as shown in Fig. 36, 37 or 38, and the same description and reference characters will therefore apply to both of these constructions.

When employing a wing wall the outer end of the same may be strengthened and finished by an upright post or column 143 preferably made hollow of sheet metal such as steel and supported at its lower and upper ends in any suitable manner on the floor and ceiling of the room and provided with a plurality of supporting arms 144 which project into the outer end of some of the channels of the wing backing plate, as shown in Figs. 36 and 39 and are of the same dove-tail form in cross section, as shown in Fig. 38 so as to form a firm connection between these members.

If desired this wing wall may also be provided between its inner and outer ends with one or more pilasters 145, as shown in Figs. 40 and 41, each of which is preferably made hollow of sheet steel and connected with the backing plate section of the wing wall sections on opposite sides of the same by means of coupling arms 146 spot welded to the opposite sides of the pilaster, as shown in Fig. 40, and fitting into the wide bottom parts of the dove-tail channels of the wing wall backing plates on opposite sides of the same, as shown in Figs. 41 and 42, and thus reliably holding the members against lateral displacement relatively to one another.

These improvements also include means whereby fixtures, such as bathroom soap holders, may be mounted in deep recesses in the wall so that the front sides of the soap holders are flush with the face of the wall. These improvements are shown in Figs. 1, 33–35 and constructed as follows:

The numeral 147 represents a soap holder or dish which is arranged in a recess 148 in the body 149 of a wall and provided at the upper and lower ends of its front part with lips 150, 151 which are secured to the adjacent parts of the wall body by means of screws 152, as shown in Figs. 33 and 34. A channeled backing plate 153 similar in construction to that shown in Figs. 2–6, 8–11 is secured to the wall body 149 around the soap holder and on the front side of this backing plate tiles 154 are mounted around the soap holder by engaging spear-shaped teeth 155 on the tiles with resilient socket strips 156 in some of the front channels of this backing plate and tapering teeth 157 on the tiles with other of said front channels in the manner indicated in Figs. 2 and 9. The frame 158 around the front end of the soap holder is flush with the face of the tiles and the marginal parts of this frame are provided with grooves 159 into which extend the rearwardly projecting flanges 160 on the adjacent edges of the tiles. Water-tight joints are formed between the soap holder and the surrounding tiles by placing cement 161 in the grooves 159 and embedding the flanges 160 therein, as shown in Fig. 35.

In order to produce a water-tight joint between the upper part of the bathtub 132 and the lower part of the tiled wall above the same means are provided which are shown in Figs. 33 and 34 and constructed as follows:

The numeral 162 represents a packing strip of rubber or similar material which is secured at its lower edge by cement 163 to the top of the adjacent part of the bathtub and which slides with its upper part in a vertical guideway formed between the lower part of the adjacent backing plate 153 and a guide plate 164 secured to the rear side of the backing plate by screws 165. In the event that the bathtub and that part of the tiled wall overhanging the same should separate more or less due to dropping of the tub or other causes the packing strips 162 will rise and fall with the tub and slide in the vertical guideway in the adjacent part of the tiled wall and thus maintain the joint between the same closed and prevent water from leaking behind the tub and creating an unsanitary condition.

For the purpose of enabling a plurality of previously assembled tiles to be mounted as a group on the wall body at one time a number of tiles may be pre-fabricated as a unit and simultaneously mounted on the wall body in the following manner:

As shown in Figs. 43 and 44 this pre-fabricated multiple tile structure comprises a plurality of tiles 103 similar to those heretofore described mounted on a backing plate 167 in the manner shown in Figs. 2, 11 and elsewhere and fastened thereto by cement 168 so that a slab or sheet is formed on which the tiles are arranged or distributed in any suitable manner. To the rear side of this backing plate are secured by spot welding or otherwise metal retaining walls 181 which are adapted to stand close to the transverse sides of the studs. At its outer edge each retaining wall is provided with a flange part of which is bent reversely, as shown at 182 in Fig. 43, to strengthen this wall and other parts of which form a plurality of bendable fastening lips or tabs 169. A multiple-tile sheet of this character is placed with its rear side against a plurality of upright wooden studs 170, or other wall body while the fastening tabs or lips project straight from the rear side of the backing plate, as shown by dotted lines in Fig. 43, and thereafter the free ends of these tabs are bent against the opposite sides of the studs and secured thereto by screws 171 or otherwise, as by full lines in Fig. 43 and at the left of Fig. 44. On its rear side the backing plate is provided with an evener coat or layer of temperature insulating cement 172 which is arranged only between adjacent studs to form an even surface on the channeled rear side of those portions of the backing plate 167, and on this evener layer 172 are secured by adhesive cement 173, or otherwise, a plurality of hard spacing blocks 174 made of insulating material such as masonite and having their front sides flush with the corresponding sides of the studs 170. To the front sides of the spacing blocks main sheets of wall board 175 are secured by cement 176, or otherwise, which sheets extend between adjacent studs 170 and retaining walls 181 and thereby form between the wall board and the backing plate carrying the tiles a cavity which is filled with a filling 177 of soft or fibrous insulating material such as rock wool. The spacing blocks, main wall board sheets and filling may be assembled with the sheet of multiple tiles and backing plate before the latter is fastened to the studs.

After the backing plate carrying a plurality of tiles has been secured to the studs together with the spacing blocks, main wall board sheets and fibrous filling mounted thereon in the manner described, additional narrow strips or sheets 178 of wall board are secured to the studs 179 by nails 179, or otherwise, flush with the main wall board sheets 175 so as to fill the gaps between the edges of adjacent main wall board sheets and produce a continuous surface, and upon these sheets of wall board a coating or layer of plaster 180 or other material may be applied for finishing the same. By these means a wall is produced which is comparatively thin, capable of resisting transmission of temperature from one side to the other, and presents a tile finish on one side and a plaster finish on the other side, thereby adapting the same specially for use between a bathroom or kitchen and living rooms of a building, and enabling the same to be manufactured and erected at low cost.

It frequently happens that a certain area which is to be covered with tiles will not permit of uniformly distributing the tiles over the respective area, and at times it may be desired to deliberately produce wider spaces between certain adjacent tiles than between other adjacent tiles in order to obtain artistic effects. For example, as shown in Fig. 45, a comparatively wide vertical slot 183 exists between two adjacent vertical rows of tiles and a comparatively wide horizontal slot 184 exists between two adjacent horizontal rows of tiles while the remaining, vertical and horizontal slots 185, 186 between the several rows of tiles shown in this figure are comparatively narrow. For the purpose of obtaining this difference in width of the vertical slots it is only necessary to shift the tiles horizontally in the horizontal front channels of the backing plate the requisite extent. An increase in the width of the horizontal slots is obtained by spreading vertically the respective horizontal channel which receives the rows of horizontal teeth of the vertically adjacent tiles so that the webs of this channel are perpendicular to the plane of the wall, as shown at 188 in Fig. 46. The bands of cement 189 and 190 in the wide vertical and horizontal slots 183, 184 is therefore greater than the width of the bands of cement 191, 192 in the narrow vertical and horizontal slots 185, 186, as shown in Fig. 45. The several bands of cement between the edges of adjacent tiles are the equivalent of the usual pointing between stones and bricks in masonry and if desired the front surfaces of these bands may be coated with a layer of paint 193, as shown in Figs. 46, 47, or otherwise treated.

Although the mechanical means herein shown for connecting the tiles with the backing plates are sufficient to hold these parts in an assembled condition it is nevertheless desirable to additionally secure the tiles to the backing plates by means of cement, as shown for example at 168 in Figs. 43, 46 and 47, inasmuch as this not only prevents the tiles from sliding on the backing plates, but also provides a solid support for tiles over their entire area and prevents any hollow drum-like sound when they are rapped by hand or hit with an object.

In utilizing tiling embodying the foregoing improvements various ornamental or decorative effects may be produced to suit individual taste and also adapt the same to some particular installation. For example, in Fig. 1 are shown a main wall having two parts arranged perpendicular to one another to form a corner, a wing wall projects at right angles from one of the main wall parts, the larger area of the wall bodies are covered with tiles of large size, a horizontal band of tiles of relatively small size is introduced between the large tiles, base tiles are arranged at the foot of some of the large tiles, triangular tiles are placed within the large tile area, towel and soap holders are mounted in appropriate parts of the walls, and a bath tub is assembled with the main and wing walls in accordance with this invention.

As a whole the several features of this invention produce a tiling for walls which is easily erected, very durable, attractive in appearance, not liable to get out of order, and economical in cost.

I claim as my invention:

1. A tiled wall including a backing plate of sheet metal which is bent to form a plurality of horizontal channels, and a plurality of sheet metal tiles each having a plurality of edges arranged at an angle relative to each other and a row of teeth on each of said edges, the teeth of some of said rows engaging lengthwise with the same channel of the backing plate and the teeth of other rows engaging transversely with different channels of said plate.

2. A tiled wall including a backing plate of sheet metal which is bent to form a plurality of forwardly opening channels, resilient socket strips arranged in some of said channels, and tiles having headed teeth interlocking with said resilient strips.

3. A tiled wall including a backing plate of sheet metal which is bent to form a plurality of forwardly opening channels of dove-tail shape in cross section, trough-shaped socket strips of resilient metal arranged in some of said channels, and tiles having headed teeth interlocking with said socket strips.

4. A tiled wall including a backing plate of sheet metal which is bent to form a plurality of forwardly opening channels of dove-tail shape in cross section, trough-shaped socket strips of resilient metal arranged in some of said channels and each having its inner part wider than its outer part and its sides provided with longitudinal corrugations, and tiles having spear-headed teeth arranged in said resilient socket strips and interlocking with the corrugations on the sides thereof.

5. A tiled wall including a backing plate of sheet metal which is bent to form a plurality of forwardly opening channels of dove-tail shape in cross section, trough-shaped socket strips of resilient metal arranged in some of said channels and each having its inner part wider than its outer part and its sides provided with longitudinal corrugations, and tiles having spear headed teeth arranged in said resilient socket strips and interlocking with the corrugations on the sides thereof, the inner parts of said channels being provided on opposite sides with enlarged seats which are engaged by opposite sides of the wide inner parts of said resilient socket strips.

6. A tiled wall including a backing plate of sheet metal which is bent to form forwardly and rearwardly opening channels on opposite sides thereof and said rear channels being of dovetail form in cross section, tiles having teeth engaging the front channels of said backing plate, and a furring plate having locking tongues of dove-tail form engaging with said rearwardly opening channels and also having non-dovetail supporting and aligning lugs engaging with said last mentioned channels.

7. A tiled wall including a backing plate of sheet metal which is bent to form forwardly and rearwardly opening channels on opposite sides thereof and said rear channels being of dove-tail form in cross section, tiles having teeth engaging the front channels of said backing plate and a furring plate having locking tongues of dove-tail form engaging with said rearwardly opening channels and also having non-dovetail supporting and aligning lugs engaging with said last mentioned channels, said furring plate comprising a sheet metal body out of which said tongues and lugs are formed, spacing webs projecting rearwardly from the edges of said body and attaching flanges projecting laterally from said webs.

8. A tiled wall including a furring plate having parts arranged at an angle to one another, a coupling bracket connected with one of said furring plate parts, backing plates mounted on said furring plate parts, and tiles mounted on said backing plates and some of the tiles on one of said backing plates having a hooking engagement with said coupling bracket.

9. A tiled wall comprising a main backing plate, a wing backing plate arranged at an angle to the main backing plate, said backing plates being bent to form channels thereon, and means for connecting said backing plates including a coupling bar arranged between an end of said wing backing plate and the adjacent part of said main backing plate, and arms projecting at an angle to each other from opposite sides of said bars and secured respectively in the bottoms of the channels of said main and wing backing plates.

10. A tiled wall including a backing plate of sheet metal which is bent to form channels on opposite sides of the same, two sets of tiles arranged on opposite sides of said backing plate and each set having teeth secured in the channels on the respective side of the backing plate, and a post provided with connecting arms projecting lengthwise into said channels on opposite sides of the same.

11. A tiled wall including a backing plate of sheet metal which is bent to form a plurality of channels, tiles having teeth engaging crosswise with said channels, and a post having arms projecting lengthwise into said channels.

12. A tiled wall including a backing plate of sheet metal which is bent to form a plurality of channels, tiles having teeth engaging crosswise with said channels, and a post having arms projecting lengthwise into said channels, said channels and the arms therein being of dove-tail form in cross section.

13. A tiled wall including backing plates of sheet metal which are arranged in the same plane and which are bent to form a plurality of channels on each of said plates, tiles provided with teeth arranged in the channels of each of said plates, and a pilaster arranged between the opposing ends of said plates and provided with coupling arms on its opposite sides which project lengthwise into the channels of the respective plates.

14. A tiled wall including backing plates of sheet metal which are arranged in the same plane and which are bent to form a plurality of channels on each of said plates, tiles provided with teeth arranged in the channels of each of said plates, and a pilaster arranged between the opposing ends of said plates and provided with coupling arms on its opposite sides which project lengthwise into the channels of the respective plates, said channels being of dove-tail form in cross section and said arms fitting into the wide rear parts of said channels.

RALPH C. WORDEN.